(12) United States Patent
Kenealy

(10) Patent No.: US 11,027,880 B1
(45) Date of Patent: *Jun. 8, 2021

(54) LAMINATED DUAL-SPECIES STAVE

(71) Applicant: DB GLOBAL, LLC, Ruffin, NC (US)

(72) Inventor: David C. Kenealy, Ruffin, NC (US)

(73) Assignee: DB Global, LLC, Ruffin, NC (US)

(*) Notice: Subject to any disclaimer, the term of this patent is extended or adjusted under 35 U.S.C. 154(b) by 67 days.

This patent is subject to a terminal disclaimer.

(21) Appl. No.: 15/372,648

(22) Filed: Dec. 8, 2016

(51) Int. Cl.
*B65D 13/00* (2006.01)
*B65D 8/00* (2006.01)
*B65D 6/14* (2006.01)

(52) U.S. Cl.
CPC ........ *B65D 9/04* (2013.01); *B65D 9/30* (2013.01)

(58) Field of Classification Search
CPC .................................... B65D 9/30; B65D 9/04
USPC ....................................... 217/88, 96
See application file for complete search history.

(56) References Cited

U.S. PATENT DOCUMENTS

| | | | |
|---|---|---|---|
| 663,591 A * | 12/1900 | Tate | |
| 1,200,581 A | 10/1916 | Brown | |
| 1,978,811 A | 10/1934 | Muller | |
| 2,050,461 A | 8/1936 | Perry | |
| 2,069,531 A * | 2/1937 | Lehner | B65D 9/04 217/88 |
| 3,710,836 A * | 1/1973 | Busch | B27B 25/00 147/19 |
| 4,227,621 A * | 10/1980 | Jones | E04H 4/00 217/96 |
| 4,484,688 A * | 11/1984 | Smith | B65D 9/06 144/353 |
| 8,381,926 B2 | 2/2013 | Kenealy et al. | |
| 8,720,503 B2 * | 5/2014 | Roberts | B27H 3/02 144/2.1 |
| 9,457,932 B2 | 10/2016 | Kenealy et al. | |
| 2002/0051586 A1 * | 5/2002 | Orndorff, Jr. | F16C 17/14 384/98 |
| 2006/0070325 A1 | 4/2006 | Magnusson | |

* cited by examiner

*Primary Examiner* — Stephen J Castellano
(74) *Attorney, Agent, or Firm* — Tuggle Duggins P.A.; Blake P. Hurt

(57) ABSTRACT

A dual-species barrel stave, the stave including a first portion that faces the interior direction of a barrel defined by a premium material such as American White Oak and a second portion that faces the exterior direction of a barrel defined by a second material, this second material of a different quality of wood that may not be intended to important aging and/or flavoring characteristics to the liquid within the barrel, is provided. The first stave portion defines a male projection or "tail" that commences at a first longitudinal end of the stave and widens substantially the entire length of the stave, terminating at the opposing longitudinal end of the stave. Cooperatively, the second stave portion defines a female dovetail groove that commences at a first longitudinal end of the stave and extends substantially the entire length of the stave, terminating at the opposing longitudinal end.

20 Claims, 9 Drawing Sheets

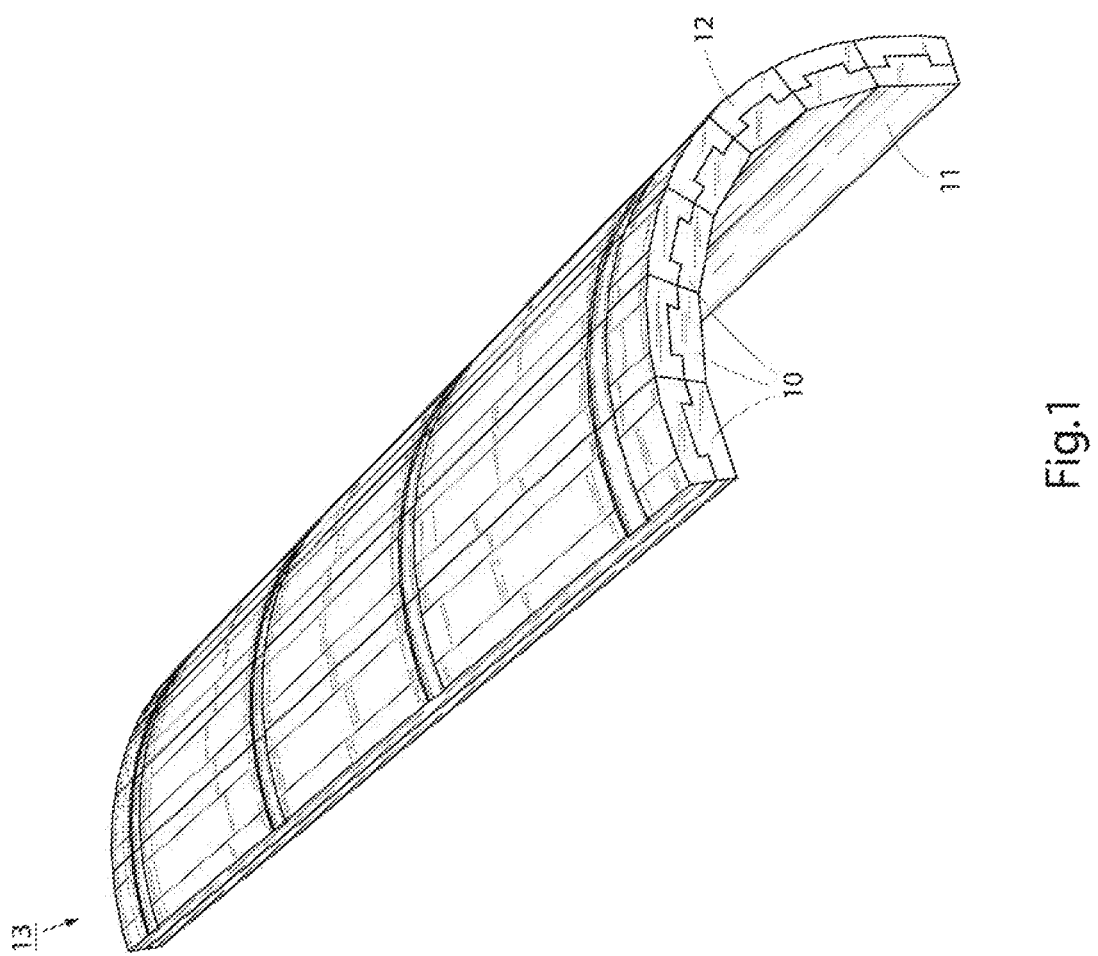

LAMINATED DUAL-SPECIES STAVE

FIELD OF THE INVENTION

The invention herein pertains to barrel staves generally and particularly pertains to a laminated stave defined by two different materials for the purpose of combining with other staves of the same, or different, construction to form a barrel.

DESCRIPTION OF THE PRIOR ART AND OBJECTIVES OF THE INVENTION

The use of a barrel in the aging process of beverages such as wine, beer, and spirits, and other liquids such as balsamic vinegar and tabasco sauce, is well-known in the art. After beverage construction, the liquid is placed inside a barrel, typically formed from an oak species such as French, American, or Spanish oak, and the liquid is left to age for a predetermined period of time. Some beverages, such as those produced by high-volume vintners, are left to age for a short period of time, for example one year, while others, such as small batch distillers, permit their beverages to age for ten years or more. During this time, the beverage within the barrel takes on certain characteristics from the wood which defines the barrel, for example vanilla, char, tannins, and the like. After roughly three years, most of a barrel's flavor compounds have been leached out and it is well on its way to becoming "neutral", at which time the beverage producer may elect to transition the fluid inside to a new barrel for additional aging and flavoring. For example, some vintners use a process referred to as "200% new oak", where the wine is put into new oak barrels twice during the aging process.

Also during this aging process, when a wine or spirit ages in a barrel, small amounts of oxygen are introduced as the barrel lets some air in (compare to microoxygenation where oxygen is deliberately added). Oxygen enters a barrel when water or alcohol is lost due to evaporation, a portion known as the "angels' share". In an environment with 100% relative humidity, very little water evaporates and so most of the loss is alcohol, a useful trick if one has a beverage such as wine with very high proof. Most beverages are topped up from other barrels to prevent significant oxidation, although others such as "vin jaune" and sherry are not. Throughout the years, beverage manufacturers have sought to reduce the evaporation event in a given barrel, for example by utilizing adhesives between the staves or overtightening the band that holds the barrel together, but adhesives eventually leach into the aging beverage and degrade the quality of the aging liquid and band tightening has proven to be ineffective.

Despite the antiquated method of production and shortcomings of the process, beverages aged in barrels have never been more popular. The Wine Institute reports that American consumption of wine alone has increased 27 million gallons of wine in the last year alone (from 886 million gallons in 2014 to 913 gallons in 2015), while numerous new outlets have reported increased American consumption of whisky close to 50% year over year. These massive increases say nothing of the exploding craft beer industry, which includes many offerings that are aged in wine or sprit barrels. While volume of the beverages in question are a concern, an even greater culprit is the lack of quality wood such as oak, chestnut, cedar, and redwood, but particularly the American and French oak staves long favored by beverage manufacturers. Some have turned to adding oak chips to the aging barrels, but this process has been roundly criticized as producing an inferior tasting beverage.

Thus, in view of the problems and disadvantages associated with prior art devices, and further in view of pending shortage of barrel staves formed from oak, the present invention was conceived and one of its objectives is to provide a barrel stave formed from a reduced amount of premium wood such as oak.

It is another objective of the present invention to provide a barrel stave formed from a first material and a second material, the first and second materials different than one another.

It is still another objective of the present invention to provide a dual-species barrel stave affixed together without the need for mechanical, adhesive, or chemical attachment members.

It is yet another objective of the present invention to provide a dual-species barrel stave whereby the first and second sections are affixed together via a male and female dovetail.

It is a further objective of the present invention to provide a dual species barrel stave whereby the first and second sections are affixed together with a longitudinally biased male and female dovetail.

It is yet a further objective of the present invention to provide a method of forming a reusable beverage barrel with a plurality of staves that are formed by at least two separate species of wood, the two species of wood attached via a male and female dovetail.

Various other objectives and advantages of the present invention will become apparent to those skilled in the art as a more detailed description is set forth below.

SUMMARY OF THE INVENTION

The aforesaid and other objectives are realized by providing a dual species barrel stave, the stave including a first portion that faces the interior direction of a barrel defined by a predetermined material such as American White Oak and a second portion that faces the exterior direction of a barrel defined by a second material, different than the first portion material, this second material of a different quality of wood that may not be intended to impart aging and/or flavoring characteristics to the liquid within the barrel. The first stave portion defines a male projection or "tail" that commences at a first longitudinal end of the stave and widens along the length of the stave, terminating at the opposing longitudinal end of the stave. Correspondingly, the second stave portion defines a female dovetail groove that commences at a first longitudinal end of the stave and extends along the length of the stave, terminating at the opposing longitudinal end thereof. The lateral sides of the first and second stave portions define a pair of opposing lateral edges with an edge angle of seven and a half degrees (7.5°), and the tail and channel define an engagement known as a sliding dovetail, wherein the tail is biased wider at the first longitudinal end and narrower at the second longitudinal end and the channel is biased wider at the corresponding first longitudinal end and narrower at the second longitudinal end. This relationship is considered complementary, in that the wider portions of each stave portion are oriented at the respective first and second stave ends.

A method of forming an aging barrel for liquids is also disclosed, and this method includes forming a dual species wooden stave as described above, further aligning the staves in a cylindrical formation, and securing the staves by placing binding members in grooves formed in the exterior surface of the outward facing stave portion. Later, if the interior of the barrel is to be resurfaced, for example with the desire of reusing the barrel to flavor additional or different beverages, a small amount of the interior facing stave portion can be removed, and then the barrel may be re-assembled and treated accordingly in preparation for the receipt of new liquid.

BRIEF DESCRIPTION OF THE DRAWINGS

FIG. 1 shows a perspective view of a quarter barrel comprised of dual-species staves;

DETAILED DESCRIPTION OF THE PREFERRED EMBODIMENT AND OPERATION OF THE INVENTION

Figure 2A:
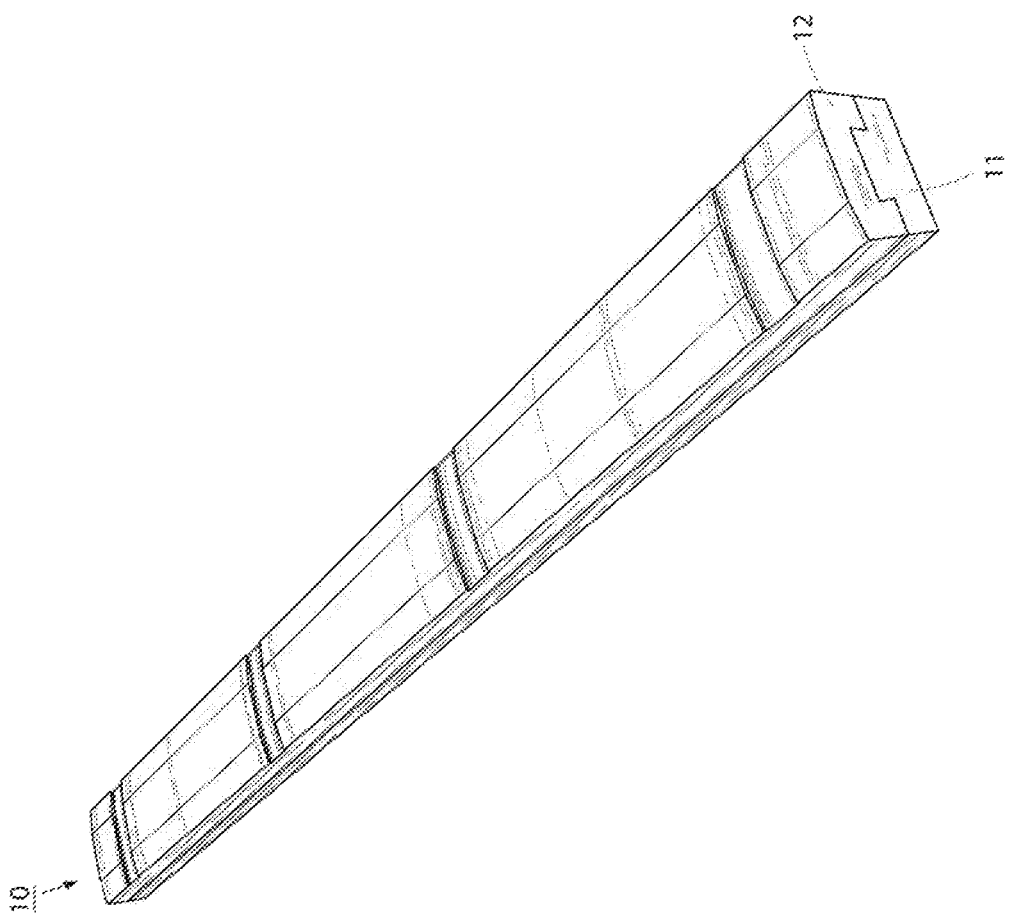
FIG. 2A pictures a perspective view of a dual-species stave.
Figure 2B:
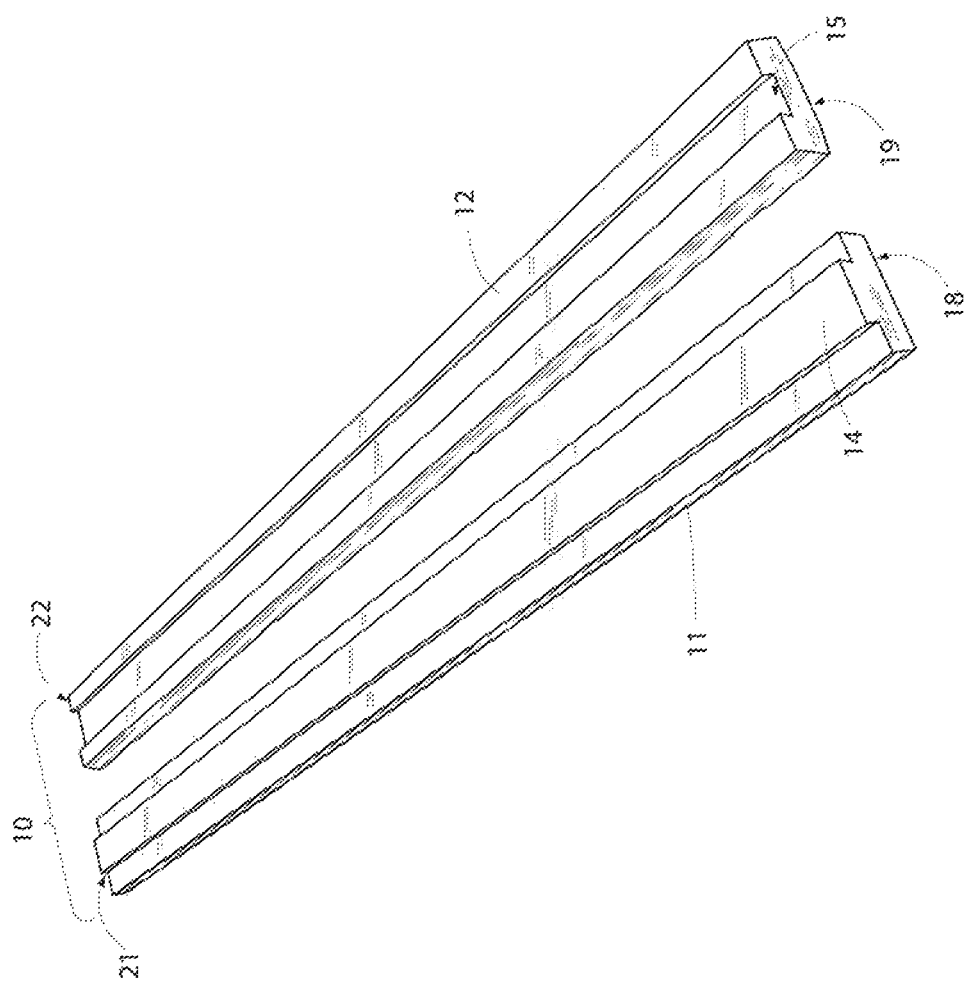
FIG. 2B depicts a perspective view of the dual-species stave of FIG. 2 with the first and second portions exploded apart.
Figure 3:
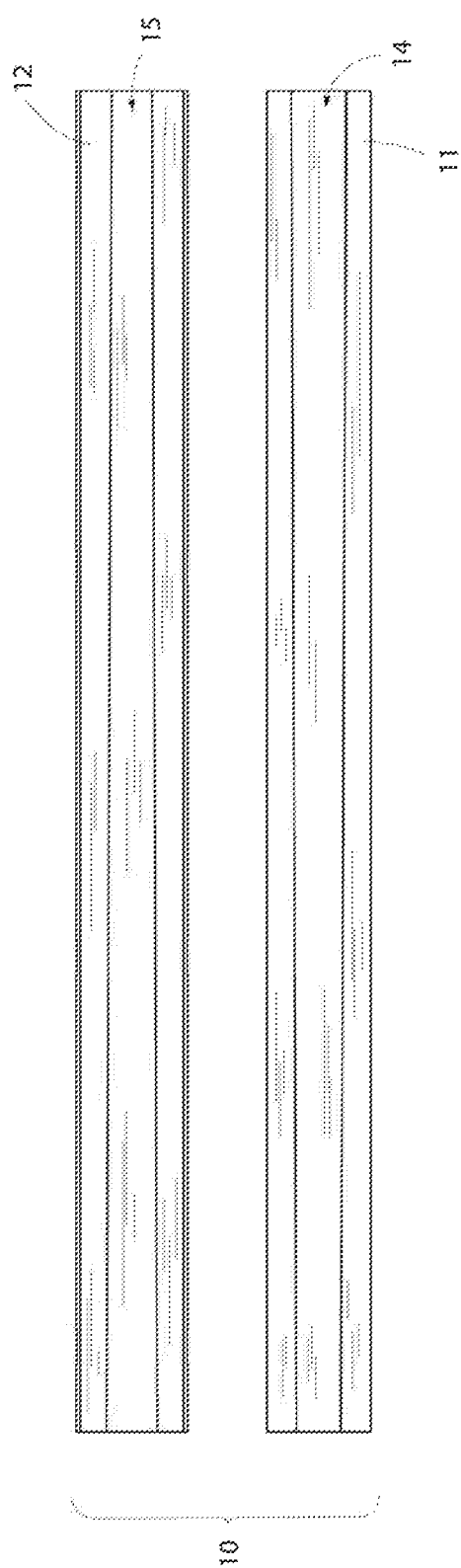
FIG. 3 demonstrates a top plan view of the stave portions of FIG. 2B.
Figure 4:
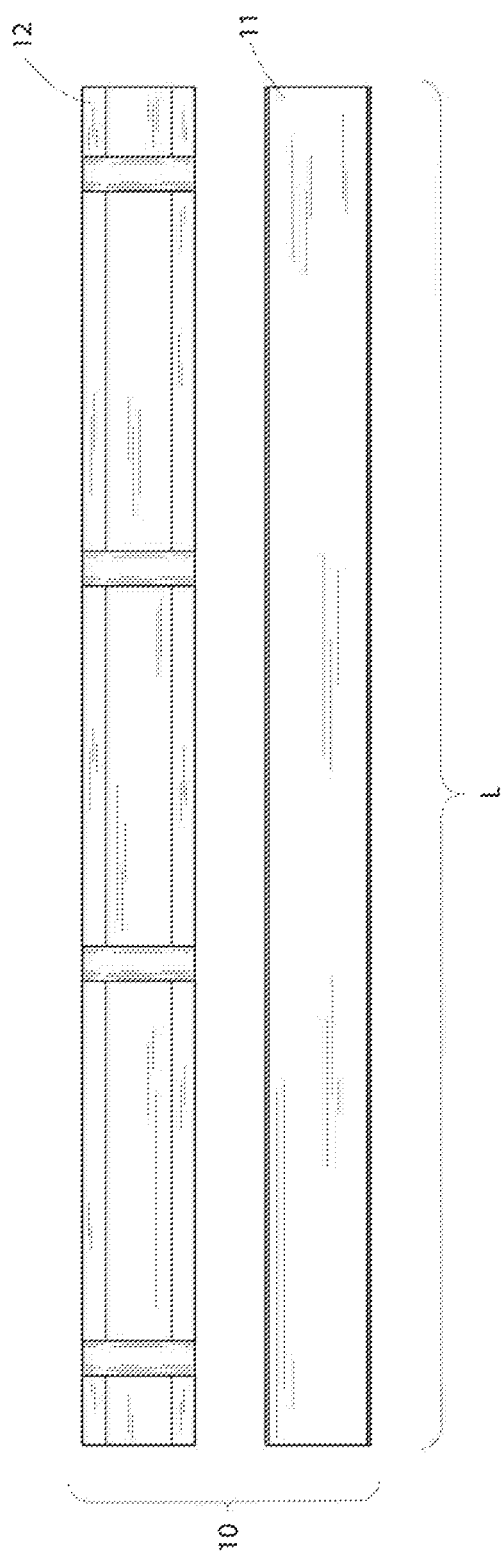
FIG. 4 illustrates a bottom plan view of the stave portions of FIG. 2B.

For a better understanding of the invention and its operation, turning now to the drawings, FIGS. 1-8 demonstrate various views of the preferred embodiment of dual-species stave 10 formed from interior stave portion 11 and exterior stave portion 12. FIG. 1 shows a perspective view of a barrel segment 13 formed from a plurality of staves 10, with the understanding that additional barrel segments 13 may be combined together to form an aging barrel with the ability to impart certain flavor or other characteristics upon a liquid (not shown) stored therein. For example, U.S. Pat. Nos. 8,381,926 and 9,457,932 disclose an aging barrel formed from a plurality of staves for imparting certain characteristics upon a liquid stored therein, the staves capable of disassembling and reassembling to form a barrel by virtue of an exterior crosswise groove and a binding member, the disclosures of these references are hereby incorporated in their respective entireties herein. With these systems and methods in combination with dual-species stave 10, barrels of varying surface-to-volume ratios can be produced. The surface-to-volume ratio of a barrel is quite significant to the industry (i.e. wineries, beer and distilleries). A few examples of some common surface-to-volume ratios are reproduced in Chart #1 below. Chart #1 illustrates the volume and surface areas of different size barrels as known in the beverage industry. It demonstrates the ratio of square inches to liters of volume. This ratio is illustrated as a ratio to a conventional 53 gallon barrel, which is a standard barrel size for aging whiskey. Based on this ratio, one may derive the number of days, weeks, and months equal in smaller barrels to the standard whiskey barrel. This information clarifies the process of aging beverages such as spirits in relation to the different size barrels.

CHART #1

| Volume (Liters) | Surface Area (Sq. Inches) | Surface to Volume Ratio | Ratio to 53 Gallon Barrel | Days = 1 yr | Weeks = 1 yr | Months = 1 yr |
|---|---|---|---|---|---|---|
| 1 Liter | 206 | 206 | 6.31 | 58 | 8.24 | 1.90 |
| 2 Liter | 297 | 148 | 4.54 | 80 | 11.45 | 2.64 |
| 3 Liter | 398 | 133 | 4.07 | 90 | 12.79 | 2.95 |
| 5 Liter | 569 | 114 | 3.49 | 105 | 14.92 | 3.44 |
| 10 Liter | 892 | 89 | 2.73 | 134 | 19.04 | 4.39 |
| 20 Liter | 1382 | 69 | 2.12 | 173 | 24.58 | 5.67 |
| 200 Liter or 53 Gallon | 6535 | 33 | 1.00 | 365 | 52.00 | 12.00 |

Figure 8:
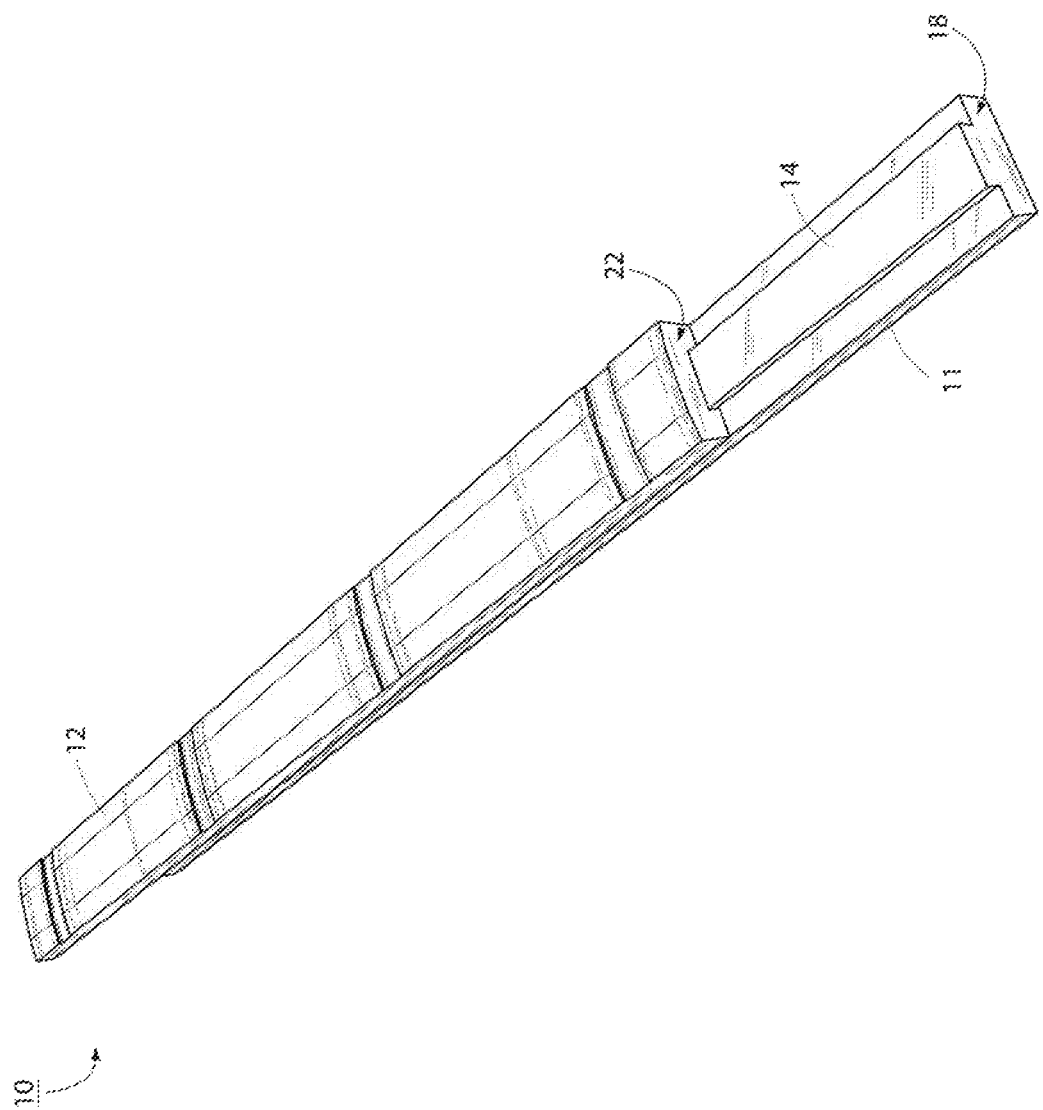
FIG. 8 depicts a perspective view of first and second stave portions in an intermediate stage of engagement.

FIGS. 2A-7 provide various views of dual-species stave 10, particularly on the construction and engagement of interior stave portion 11 and exterior stave portion 12. FIG. 8 is a perspective view of interior stave portion 11 partially engaged with exterior stave portion 12 while FIG. 2A is a perspective view of interior stave portion 11 fully engaged with exterior stave portion 12, all without the need of a portion-to-portion fastener such as a mechanical fastener, an adhesive, or the like. As shown more clearly in the perspective view of FIG. 2B with interior stave portion 11 separated from exterior stave portion 12, interior stave portion 11 defines a centrally positioned projection or "tail" 14 that extends substantially the longitudinal length of interior stave portion 11, and preferably extends the entire longitudinal length of interior stave portion 11. Also demonstrated in the top plan view of FIG. 3, exterior stave portion 12 defines a centrally located channel or groove 15 that extends substantially the longitudinal length of exterior stave portion 12, and preferably extends the entire longitudinal length of exterior stave portion 12.

Although it is intended that the respective metrics of exterior stave portion 12 and interior portion 11 may be modified to achieve the proper surface to volume ratios demonstrated in Chart #1, preferred stave portions 11 and 12 each define a length L (see FIG. 4) of at least thirty inches (76.20 cm) and more preferably define a length of about thirty-nine inches (99.06 cm), and most preferably define a length of thirty-nine inches (99.06 cm). Further, preferred stave portions 11 and 12 each define a width W (see FIG. 5) of at least two inches (5.08 cm) and more preferably define a width of about three inches (7.62 cm) and most preferably define a width of three inches (7.62 cm). This is true even though the exterior of exterior portion 12 (i.e. the surface that faces what would be the exterior of a barrel formed from a plurality of staves 10) defines a non-planar and somewhat arcuate surface relative to the interior of interior portion 11 (i.e. the surface that faces what would be the interior of a barrel formed from a plurality of staves 10) which defines a more planar surface (see FIGS. 5 and 6 for comparison). This is true because both interior stave portion 11 and exterior stave portion 12 include correspondingly angled (i.e. not vertical or axial relative to the horizon) lateral side walls 16 (interior stave portion 11) and 17 (exterior stave portion 12) also shown in FIG. 7. In the preferred embodiment of dual-species stave 10, interior stave portion 11 and exterior stave portion 12 define respective lateral side walls 16 and 17 with an edge angle of less than ten degrees (10°), and more preferably define lateral side walls 16 and 17 with an edge angle of about five degrees (5°) and most preferably define lateral side walls 16 and 17 with an edge angle of seven and a half degrees (7.5°). The consistent definition of lateral side walls 16 and 17 allows the uniform attachment of interior stave portion 11 to exterior stave portion 12, and when assembled into a barrel, such as seen by barrel segment 13 in FIG. 1, permits the leak-proof attachment without need for a stave-to-stave attachment member or method. An embodiment of dual-species stave 10 may include one or more laterally oriented pegs (not shown) into one or more ends of stave 10 in the event the user wishes a secondary fastening method in relation to the dovetail arrangement as described below.

While numerous types of dovetail attachments are known in the prior art, the specific relationship contemplated by dual-species stave 10 is sometimes referred to as a "sliding dovetail." The sliding dovetail is a method of joining two members at right angles, where the intersection occurs within the field of one of the members that is not at the end. This joint provides the interlocking strength of a dovetail. Sliding dovetails are assembled by sliding the tail 14 into the channel 15 along some longitudinal length of the respective members, but in the preferred embodiment of stave 10, the respective walls of tail 14 and channel 15 are angled in a complementary manner, such that their engagement does not occur at a 90° relationship. Further, each sidewall of tail 14 oriented parallel to the corresponding sidewall of channel 15. It is common to slightly taper the channel 15, making it slightly tighter towards the rear of the joint, so that the two components can be slid together easily but the joint becomes tighter as the finished position is reached. Another method to implement a tapered sliding dovetail would be to taper the tail 14 instead of the channel 15. However the dovetail attachment deployed by dual-species 10 is unique, as both tail 14 and channel 15 are tapered along the respective longitudinal lengths of interior stave portion 11 and exterior stave portion 12.

Figure 5:
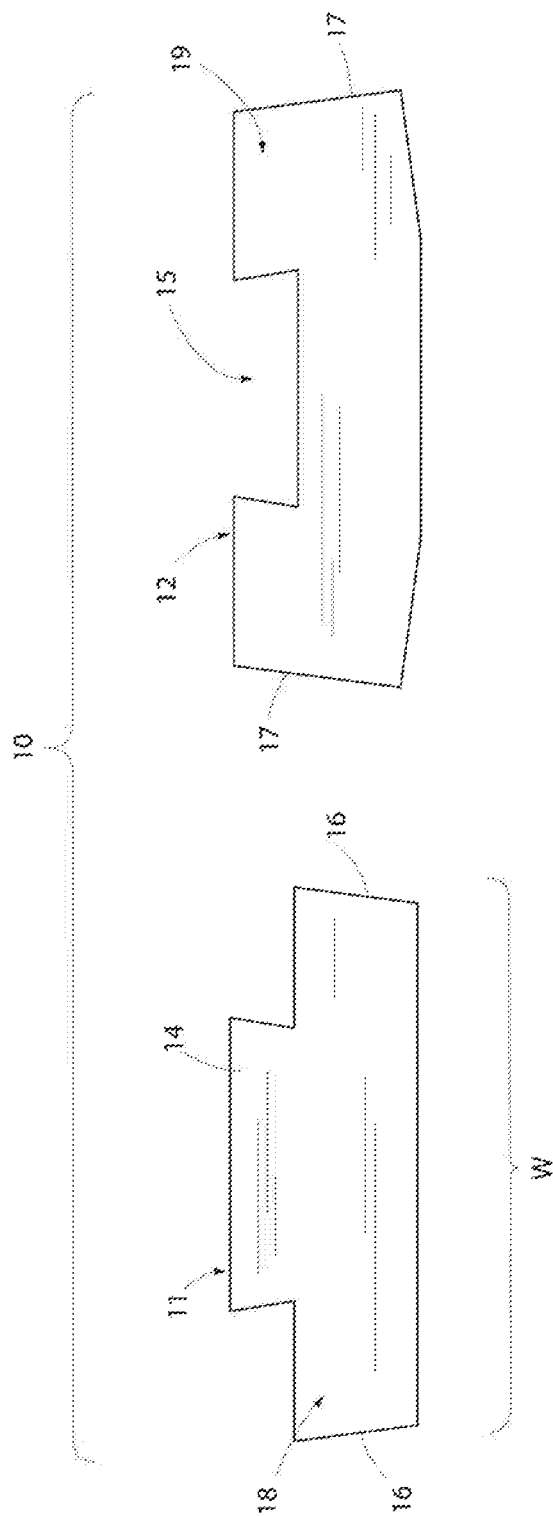
FIG. 5 features an elevated first end view of the stave portions of FIG. 2B.

The terms "first end" and "second end" are utilized for the purpose of clarity, but are not intended to be limiting terms relative to the scope of disclosure afforded dual-species stave 10. FIG. 5 features an elevated view of first ends 18 and 19 as defined by interior stave portion 11 and exterior stave portion 12, respectively. As described previously interior stave portion 11 defines tail 14 and exterior stave portion 12 defines channel 15, but both staves define stave core or body 20 with a thickness T (see FIG. 6) of at least an inch (2.54 cm) and more preferably a thickness T of at least one and three-eighths of an inch (3.49 cm), and most preferably one and three-eighths of an inch (3.49 cm). This width may be increased as desired to extend the life of a reusable barrel stave, as described in U.S. Pat. No. 8,381,926. Specifically, thickness T may be increased to permit additional resurfacing of the inner facing face of interior stave portion 11, as based upon average absorption of beverage into a substrate such as wood, this interaction only involves about three-sixteenths of an inch to a quarter inch (0.48 cm to 0.64 cm) of the thickness T of the stave.

First end 18 of interior stave portion 11 demonstrates at its widest embodiment as seen in FIG. 5. Preferred tail 14 defines a width of at least two inches (5.08 cm) at first end 18 and more preferably defines a width of about two and an eighth inches (5.40 cm) at first end 18, and most preferably defines a width of two and an eighth inches (5.40 cm) at first end 18. As previously described, this width lessens, and tail 14 becomes narrower, as the tail position moves longitudinally away from first end 18. Correspondingly, first end 19 of exterior stave portion 12 represents the narrowest width of channel 15. Preferred channel 15 defines a width of less than two inches (5.08 cm) at first end 19, and more preferably defines a width of about one and seven eighth inches (4.76 cm) at first end 19, and most preferably defines a width of one and seven eighth inches (4.76 cm) at first end 19. In the complementary manner relative to tail 14 and first end 18, channel 15 grows and widens as the channel position moves longitudinally away from first end 19.

Figure 6:
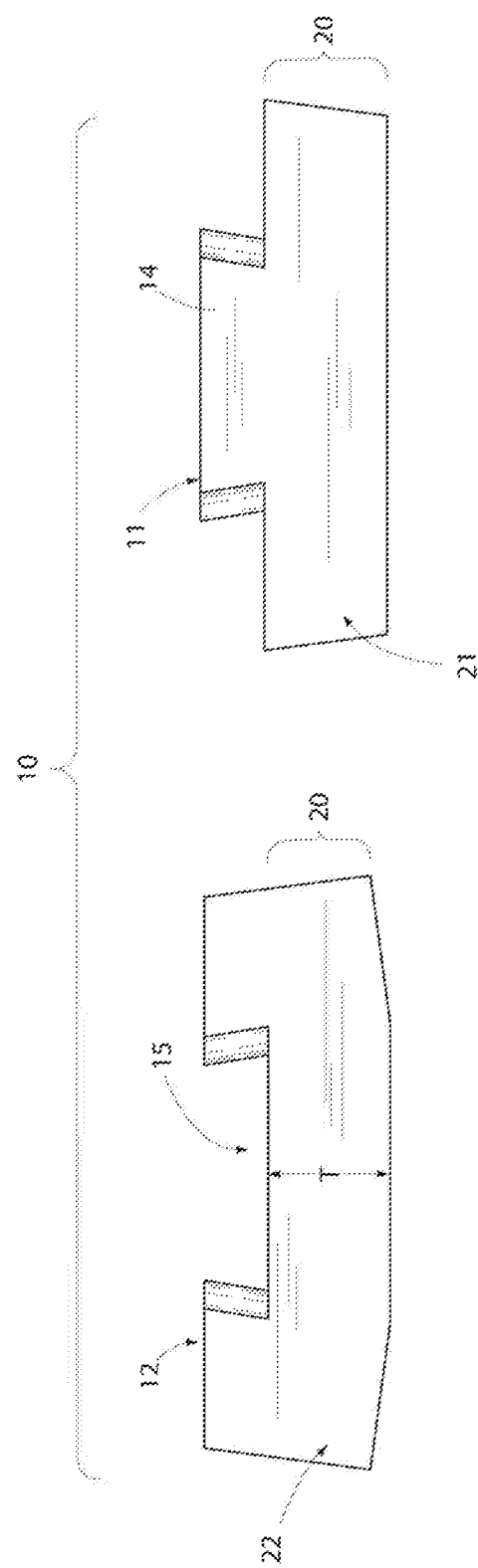
FIG. 6 shows an elevated second end view of the stave portions of FIG. 2B.
Figure 7:
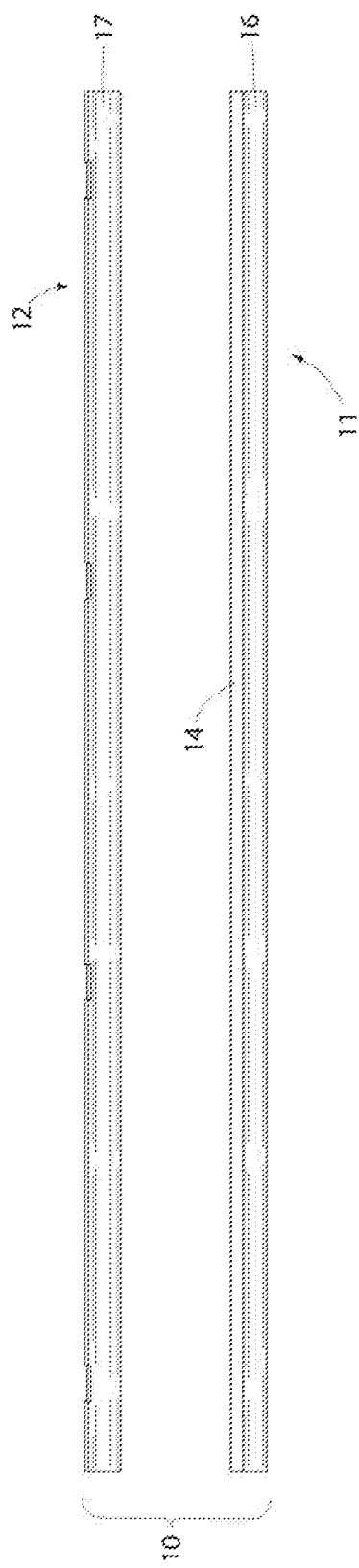
FIG. 7 illustrates an elevated side view of the stave portions of FIG. 2B, the opposing side view being a mirror image thereof.

As represented in an elevated end view in FIG. 6, second end 21 of interior stave portion 11 presents the narrowest portion of tail 14. Preferred tail 14 defines a width of less than two inches (5.08 cm) at second end 21, and more preferably defines a width of about one and seven eighth inches (4.76 cm) at second end 21, and most preferably defines a width of one and seven eighths inches (4.76) at second end 21. By comparison, second end 22 of exterior stave portion 12 shows the widest representation of channel 15. Preferred channel 15 defines a width of at least two inches (5.08 cm) at second end 22, and more preferably defines a width of two and an eighth inches (5.40 cm) at second end 22, and most preferably defines a width of two and an eighth inches (5.40 cm) at second end 22. As demonstrated throughout the figures, tail 14 and channel 15 narrow and/or widen relatively to the respective first and second ends along the entire longitudinal length of interior stave portion 11 and exterior stave portion 12, resulting in a robust frictional engagement as demonstrated in FIG. 2A without the need for any additional stave portion attachment members or methods.

A method of forming a reusable beverage container such as a barrel may include the step of providing a dual-species stave 10 defined by interior stave portion 11 and exterior stave portion 12. Interior stave portion 11 may be formed from a primary, high quality or high value wood imbued with characteristic known to impart flavor or other tasting characteristics to liquids aged therein. This primary wood may be selected from premium species such as French or American White Oak, but is intended to reference any wood whose desirable beverage-enhancing characteristics may be offset by the availability or cost of said wood. By comparison, exterior stave portion 12 can be formed from a secondary wood, perhaps unsuitable or less desirable for use in the aging process for liquids such as beer, wine, or spirits. For context, the average price for a toasted, solid, American White Oak barrel as reported by the New York Times in August of 2016 was $575, while the average price for a toasted, solid, French Oak barrel as reported by the same publication was about $700. Therefore, it is highly advantageous from a cost perspective to include only the bare minimum of the premium wood used to form the interior stave portion 11, and to provide the structural support elements from a lower-cost material. However, combining interior stave portion 11 with exterior stave portion 12 creates a problem, as aging time that stretches into decades practically mandates that any adhesive would seep into the barrel flavoring profile, and mechanical fasteners would result in leaks over time. Previously, the only way to prevent these undesirable outcomes was to periodically switch out the aging barrels for new ones, thereby enhancing the cost proposition for barrel manufacturers and purchasers. The instant invention contemplates a sliding dovetail engagement between interior stave portion 11 and exterior stave portion 12, with interior stave portion 11 defining an outwardly angled tail at more than five degrees (5°), and more preferably at about seven and a half degrees (7.5°), and in the most preferred embodiment parallel to the sidewalls defined by the lateral sides of interior stave portion 11. Tail 14 is biased or tapered from one longitudinal end to the other, resulting in a width that increases or decreases over the longitudinal length of interior stave portion 11. Cooperatively, exterior stave portion 12 defines a correspondingly positioned channel 15 with angular walls that match the angled tail 14 and extends the length of exterior stave portion 12. Channel 15 is complementary tapered or biased along the length of exterior stave portion 12, such that the narrowest part of interior stave portion 11 is aligned with the widest part of exterior stave portion 12. In use, and as demonstrated in FIG. 8, the narrow second end 21 of tail 14 is inserted into the wider second end 22 of channel 15 and passed along longitudinally until a friction fit is achieved between interior stave portion 11 and exterior stave portion 12. The positioning in FIG. 8 is intended to be illustrative, but approximately about the shown position (for example between ⅔ and ¾ of the longitudinal length defined by stave), a small amount of additional force, for example a tap or two by a rubber mallet, is all that is needed to drive the two portions together to achieve a robust attachment to one another, without the need for a mechanical fastener or adhesive, such that narrow second end 21 of stave portion 11 is mated within narrow first end 19 of stave portion 12 and likewise wider first end 18 of stave portion 11 is mated within wider second end 22 of stave portion 12. After the stave portions are connected (or laminated), they may be formed into quarter barrel segments 13 as shown in FIG. 1, or banded together to form a barrel as conventional. However, only by banding and disbanding the barrel segments, and then resurfacing these segments as taught by U.S. Pat. Nos. 8,381,926 and 9,457,932, are the efficiencies contemplated by the instant invention fully realized.

The illustrations and examples provided herein are for explanatory purposes and are not intended to limit the scope of the appended claims.

I claim:

1. A two-piece stave consisting of an interior stave member and an exterior stave member, the interior stave member formed from a first material, the exterior stave member formed from a second material different from the first material, the interior stave member affixed to the exterior stave member via a dovetail joint consisting of a tail formed on the interior stave member and a channel formed on the exterior stave member, wherein the tail and the channel have corresponding sizes and shapes, wherein the tail and the channel each define a taper extending along substantially an entire longitudinal length of the respective stave members, and wherein the interior stave member and the exterior stave member each define a thickness of at least 1 inch.

2. The stave of claim 1 wherein the dovetail joint is defined as a sliding dovetail joint.

3. The stave of claim 1 wherein the tail and the channel are defined by sidewalls that define the same angle.

4. The stave of claim 1 wherein the interior stave member and the exterior stave member are each defined by parallel side walls.

5. The stave of claim 1 wherein the interior stave member and the exterior stave member each define a longitudinal length of at least 30 inches.

6. The stave of claim 1 wherein the interior stave member and the exterior stave member each define a lateral edge angle of 7.5°.

7. The stave of claim 1 wherein the interior stave member is formed from American White Oak.

8. The stave of claim 1 wherein the interior stave member is formed from French Oak.

9. A two-piece stave consisting of an interior stave member and an exterior stave member, the interior stave member formed from a first material, the exterior stave member formed from a second material different from the first material, the interior stave member affixed to the exterior stave member via a dovetail joint consisting of a tail formed on the interior stave member and a channel formed on the exterior stave member, wherein the tail and the channel have corresponding sizes and shapes, wherein the tail and the channel each define a taper extending along substantially an entire longitudinal length of the respective stave members, and wherein the interior stave member and the exterior stave member each define a longitudinal length of at least 30 inches.

10. The stave of claim 9 wherein the dovetail joint is defined as a sliding dovetail joint.

11. The stave of claim 9 wherein the tail and the channel are defined by sidewalls that define the same angle.

12. The stave of claim 9 wherein the interior stave member and the exterior stave member are each defined by parallel side walls.

13. The stave of claim 9 wherein the interior stave member and the exterior stave member each define a thickness of at least 1 inch.

14. The stave of claim 9 wherein the interior stave member and the exterior stave member each define a width of at least 2 inches.

15. The stave of claim 9 wherein the interior stave member and the exterior stave member each define a lateral edge angle of 7.5°.

16. The stave of claim 9 wherein the interior stave member is formed from American White Oak.

17. The stave of claim 9 wherein the interior stave member is formed from French Oak.

18. A method of forming a stave comprising the steps of
providing the interior stave member and the exterior stave member of claim 9; and
attaching the interior stave member to the exterior stave member via a dovetail joint defined by a tail formed on the interior stave member and a channel formed in the exterior stave member, wherein the tail and the channel have corresponding sizes and shapes, and wherein the tail and the channel each define a taper extending along substantially an entire longitudinal length of the respective stave members.

19. The method of claim 18 whereby attaching the interior stave member to the exterior stave member via a dovetail joint defined by a tail formed on the interior stave member and a channel formed in the exterior stave member further comprises forming a sliding dovetail joint.

20. The method of claim 18 whereby the interior stave member is formed from American White Oak or French Oak.

* * * * *